(12) United States Patent
Chou et al.

(10) Patent No.: US 10,469,691 B2
(45) Date of Patent: Nov. 5, 2019

(54) SCANNER

(71) Applicant: FOXLINK IMAGE TECHNOLOGY CO., LTD., New Taipei (TW)

(72) Inventors: Tsung Ching Chou, New Taipei (TW); Wen Ching Liao, New Taipei (TW)

(73) Assignee: FOXLINK IMAGE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/150,322

(22) Filed: Oct. 3, 2018

(65) Prior Publication Data

US 2019/0208071 A1 Jul. 4, 2019

(30) Foreign Application Priority Data

Dec. 28, 2017 (TW) .............................. 106219350 U

(51) Int. Cl.
*H04N 1/00* (2006.01)
*H04N 1/409* (2006.01)

(52) U.S. Cl.
CPC ....... *H04N 1/00909* (2013.01); *H04N 1/0062* (2013.01); *H04N 1/00631* (2013.01); *H04N 1/4097* (2013.01)

(58) Field of Classification Search
CPC .................. H04N 1/00909; H04N 1/0062
See application file for complete search history.

(56) References Cited

U.S. PATENT DOCUMENTS

| 2004/0027588 A1* | 2/2004 | Linnemann | G01D 5/30 356/615 |
| 2005/0141051 A1* | 6/2005 | Kashu | H04N 1/00909 358/474 |

\* cited by examiner

*Primary Examiner* — Ibrahim Siddo
(74) *Attorney, Agent, or Firm* — WPAT, PC

(57) ABSTRACT

The present invention is related to a scanning device for scanning documents, comprises a flat-bed scanning glass; a contact image sensor arranged above the flat-bed scanning glass separately to form a scanning path therebetween, a bottom surface of the contact image sensor being arranged with a protecting glass, a middle area of the protecting glass being configured as a scanning area, and a chamfer being arranged at the bottom surface of the protecting glass at a downstream position relative to the scanning area. Hence the dust of documents in this invention would be stacked in the chamfer during the scanning process temporarily and then be wiped away by the document itself, so as to assure the dust would not be stacked in the scanning area. The scanning device in this invention is capable to maintain the scanning quality without clearing the dust even after scanned a massive quantity of documents.

5 Claims, 5 Drawing Sheets

SCANNER

CROSS-REFERENCE TO RELATED APPLICATION

The present application is based on, and claims priority form, Taiwan Patent Application No. 106219350, filed Dec. 28, 2017, the disclosure of which is hereby incorporated by reference herein in its entirety.

BACKGROUND OF THE INVENTION

1. Field of the Invention

This invention relates to a scanner.

2. The Related Art

Referring to the FIG. 1 and FIG. 2 now, a conventional scanning device 100' comprises a flat-bed scanning glass 10' and a contact image sensor 20'. The contact image sensor 20' is arranged above the flat-bed scanning glass 10' separately and formed a scanning path 30' therebetween for feeding documents 200' through. The contact image sensor 20' comprises a hollowed frame 21' which extended in horizontal direction, a protecting glass 22', a circuit board 23', a plurality of light emitters 24', a plurality of lenses 25' and a plurality of photoelectric detectors 26'. Each of the lenses 25' is paired with a photoelectric detector 26' and a light emitter 24'. The protecting glass 22' is rectangular and arranged at the bottom surface of the frame 21', and the bottom surface of the protecting glass 22' is aligned with the bottom surface of the frame 21'. The plurality of light emitters 24' are arranged in a row inside the frame 21', and each of the light emitters 24 emits a beam that passes through the protecting glass 22' and illuminates the documents 200' in the scanning path 30', and the documents 200' reflects the beam back to the lenses 25'. The circuit board 23' is arranged on the upper surface of the frame 21' and a plurality of photoelectric detectors 26' is arranged on the circuit board 23' to receive the beam focused by the lenses 25'. The middle area of the protecting glass 22' is configured as a scanning area 27', the scanning area 27' is the area that the beam reflected by the documents 200' arrives the protecting glass 22', and the scanning process is completed while the documents 200' passed through the scanning area 27'.

However, dust 300' such as the carbon powder attached on the documents 200' and tiny paper pieces often fall off from the documents 200' during the scanning process and stacked in the scanning area 27', thus the dust 300' will increase with each document scanned, and eventually causes the dirty or the unexpected horizon line on the scanned image. Therefore, the protecting glass 22' needs to be clean to maintain the scanning quality.

In another conventional scanning device (not shown), a cleaning module is arranged. The cleaning module is consisted with a brush, a motor, gears and such on, and the cleaning module will drive the brush to clean the scanning area. However, the cleaning module costs more, needs extra space to install and makes more noise while cleaning.

Therefore, it is necessary to provide a scanning device being able to maintain the scanning quality without clean dust, has lower manufacturing cost, smaller in size and makes less noise.

SUMMARY OF THE INVENTION

The objective of the present invention is to provide a scanning device which is capable to maintain the scanning quality without cleaning the dust even after scanned a massive quantity of documents, the manufacturing cost is lower, the size of it is smaller and makes less noise for overcoming the defects in the prior art.

To achieve said objective, the scanning device for scanning documents in this invention comprises a flat-bed scanning glass; a contact image sensor arranged above the flat-bed scanning glass separately to form a scanning path therebetween, a bottom surface of the contact image sensor being arranged with a protecting glass, a middle area of the protecting glass being configured as a scanning area, and a chamfer being arranged at the bottom surface of the protecting glass at a downstream position relative to the scanning area.

In conclusion, the bottom surface of the protecting glass in this invention is arranged with a chamfer to make the dust such as carbon powder or tiny paper pieces of the documents in this invention would be temporarily stacked in the chamfer during the scanning process and then be wiped away by the document itself, so as to assuring the dust would not be stacked in the scanning area, hence the scanning device in this invention is capable to maintain the scanning quality without cleaning the dust even after scanned a massive quantity of documents. Furthermore, the scanning device doesn't equip with a cleaning module so that the manufacturing cost is low, the size of it is small and the noise is reduced.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical contents, structural features, purpose to be achieved and the effectiveness of the present invention, the detailed description is given with schema below.

Figure 1:
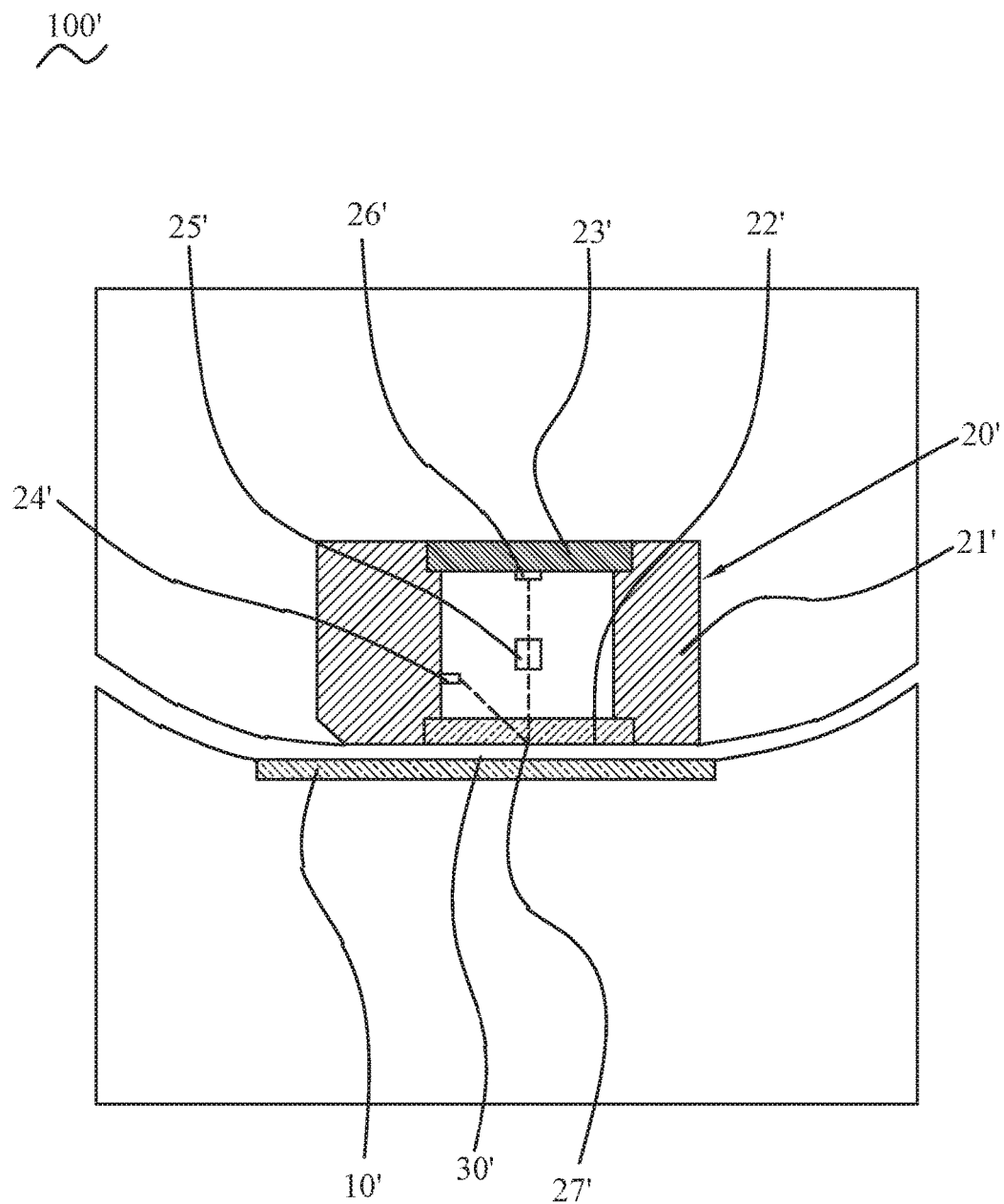
FIG. 1 is a schematic diagram showing a conventional scanning device.
Figure 2:
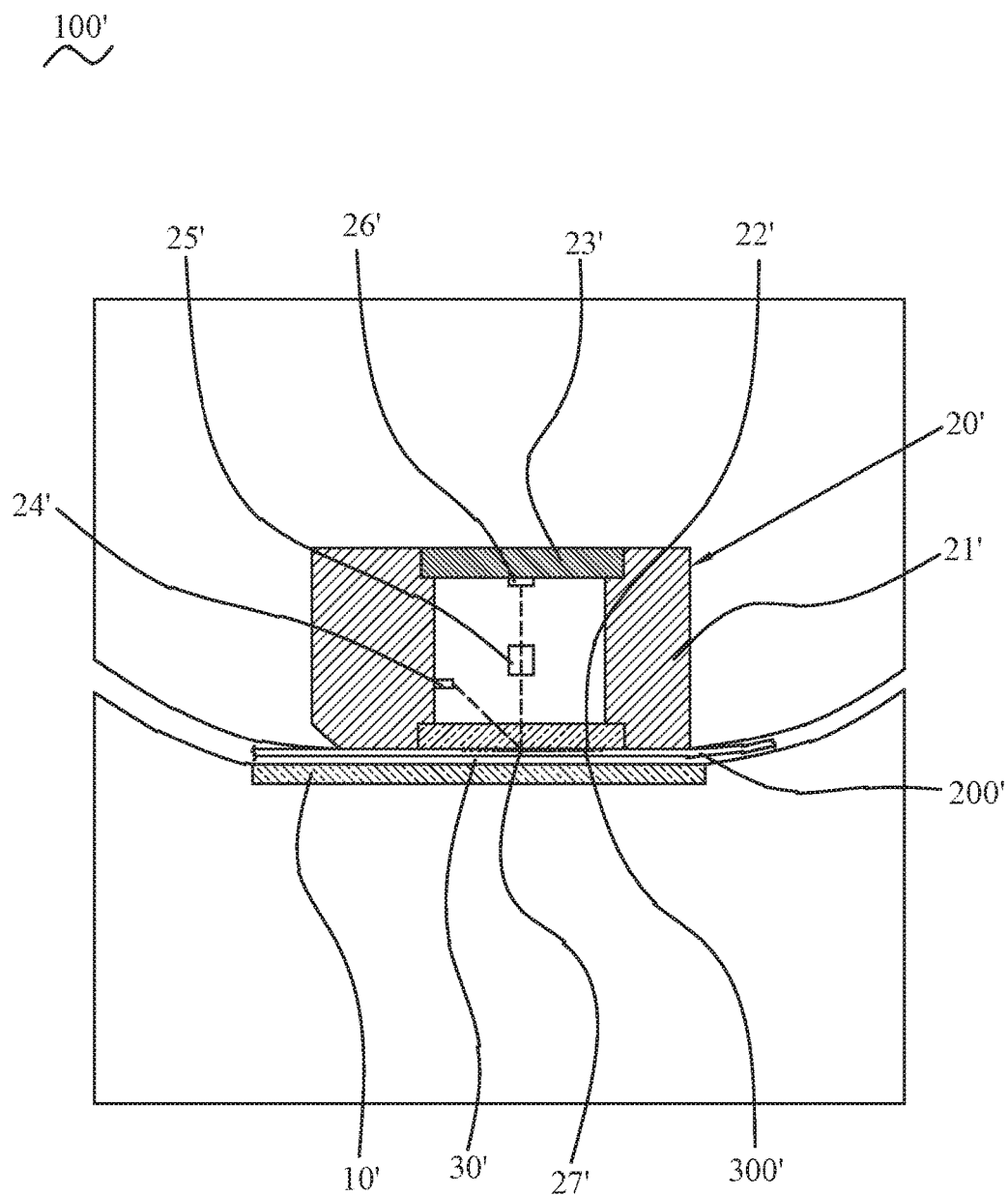
FIG. 2 is a schematic diagram showing a conventional scanning device while scanning documents.
Figure 3:
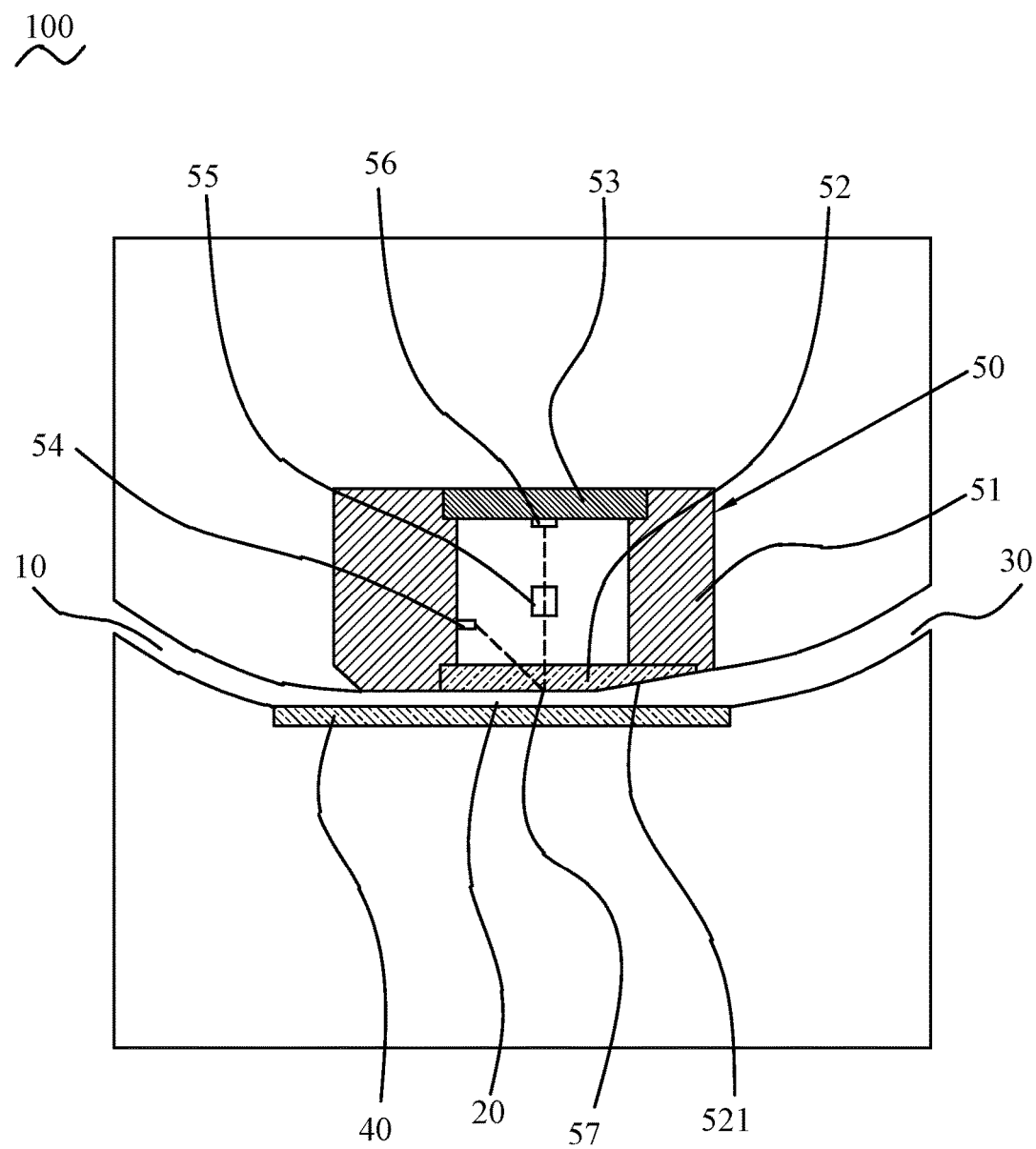
FIG. 3 is a schematic diagram showing a scanning device in the present invention in a preferred embodiment.
Figure 4:
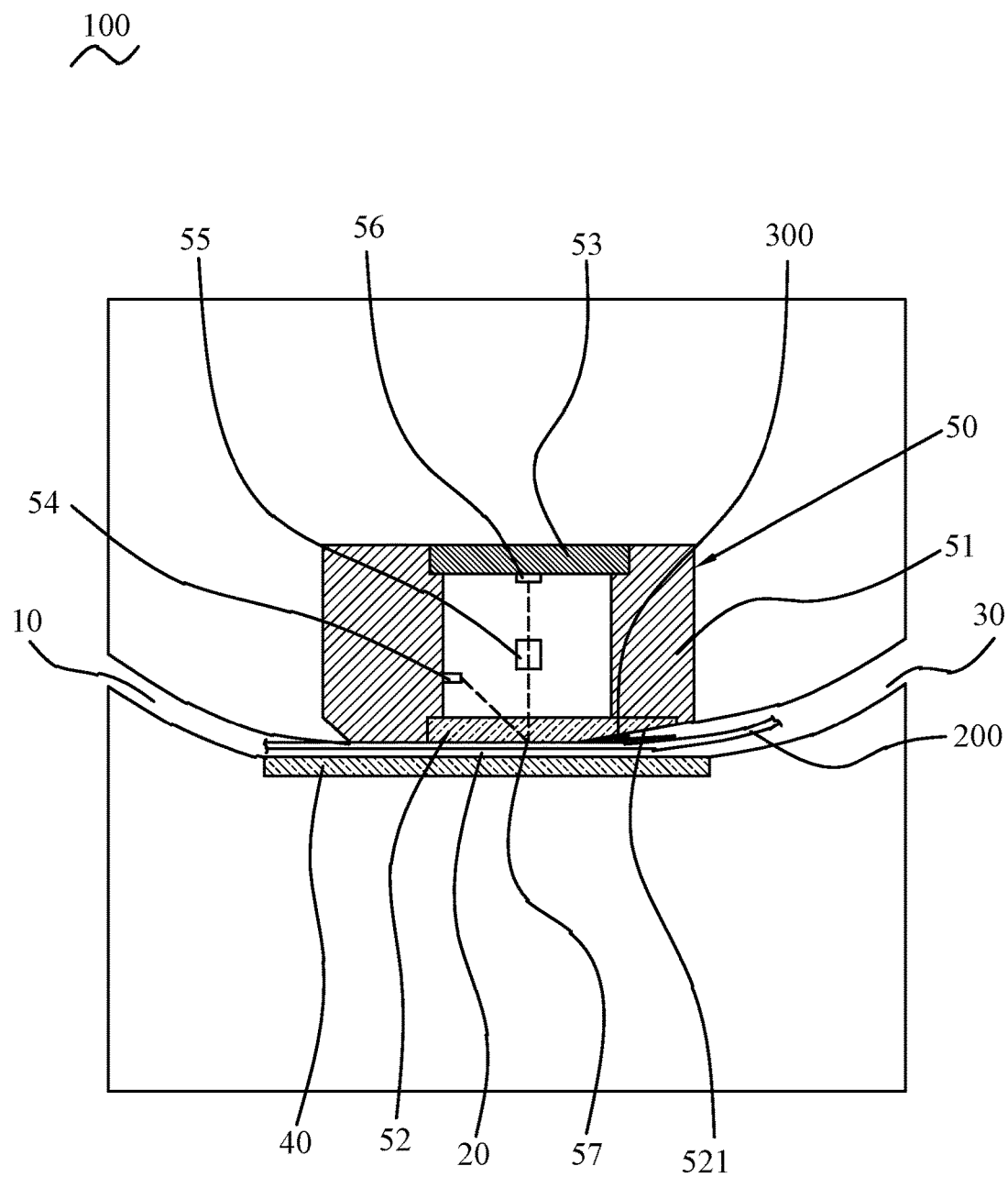
FIG. 4 is a schematic diagram showing the scanning device in the present invention while scanning documents.

Referring to FIG. 3 and FIG. 4, a scanning device 100 in this invention is made for scanning documents 200. Inside of the scanning device 100. A feed-in path 10 connecting with an outer surface of the scanning device 100. The direction that the documents 200 being fed is defined as back and the direction that being opposite to the feeding direction is defined as front, a scanning path 20 is connected at the back end of the feed-in path 10 for feeding the documents 200 through, and a feed-out path 30 is connected at the back end of the scanning path 20, and the scanning device 100 comprising a flat-bed scanning glass 40 and a contact image sensor 50.

The contact image sensor 50 is arranged above the flat-bed scanning glass 40 separately and formed the scanning path 20 therebetween.

Figure 5:
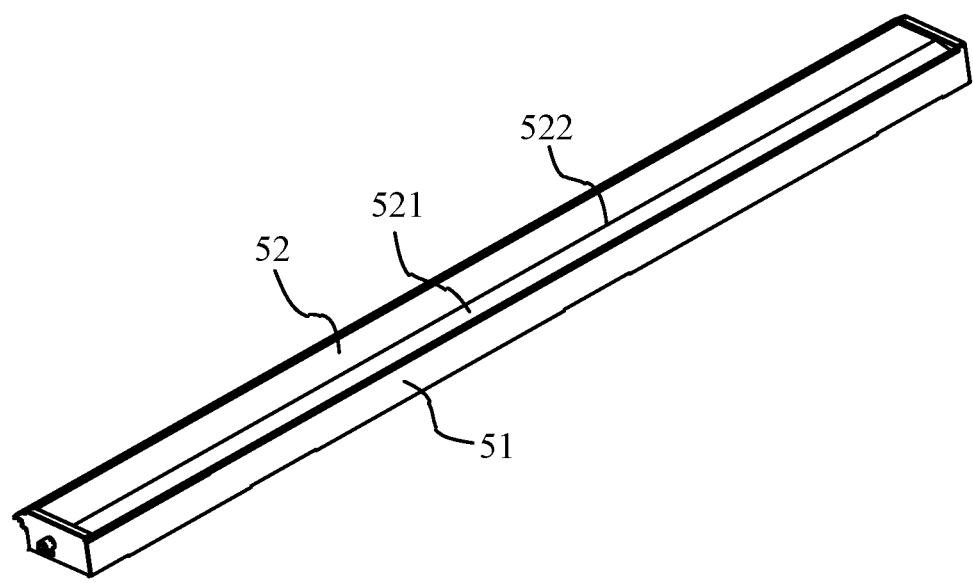
FIG. 5 is a perspective diagram of a contact image sensor of the scanning device in the present invention.

Referring to FIG. 3 to FIG. 5 now, the contact image sensor 50 comprises a hollowed frame 51 which extends in horizontal direction, a protecting glass 52, a circuit board 53, a plurality of light emitters 54, a plurality of lenses 55 and a plurality of photoelectric detectors 56. Each of the lenses 55 is paired with each of the photoelectric detector 56 and each of the light emitter 54. The protecting glass 52 is rectangular and arranged at a bottom surface of the frame 51, and the bottom surface of the protecting glass 52 is aligned with the bottom surface of the frame 51. The plurality of light emitters 54 are arranged in a row inside the frame 51, and each of the light emitters 54 emits a beam that passes through the protecting glass 52 and illuminates the documents 200 in the scanning path 20, and the documents 200 reflects the beam back to the lenses 55. The circuit board 53 is arranged on an upper surface of the frame 51 and the photoelectric detectors 56 is arranged on the circuit board 53 to receive the beam focused by the lenses 55. A middle area of the protecting glass 52 is configured as a scanning area 57. The scanning area 57 is the area that the beam reflected by the documents 200 arrives the protecting glass 52, and the scanning process is completed while the documents 200 are passed through the scanning area 57, and a chamfer 521 is arranged at the bottom surface of the protecting glass 52 right behind the scanning area 57. In this case, the chamfer 521 is arranged at a downstream position relative to the scanning area 57.

Referring to FIG. 3 to FIG. 5, the working principle of the scanning device 100 in this invention is described below: with the help of the chamfer 521 arranged on the bottom surface of the protecting glass 52, a contacting position of the document 200 contacted to the protecting glass 52 is moved backward to an edge-line 522 of the chamfer 521 while the document 200 is passing through the scanning path 20. As the result, the dust 300 such as the carbon powder or the tiny paper pieces of the documents 200 in this invention would be stacked in the chamfer 521 during the scanning process temporarily and then be wiped away by the document 200 itself, so as to assure the dust 300 would not be stacked in the scanning area 57, hence the scanning device 100 in this invention is capable to maintain the scanning quality without cleaning the dust 300 even after a massive quantity of documents 200 are scanned.

In conclusion, the bottom surface of the protecting glass 52 in this invention is arranged with a chamfer 57 to make the dust 300 such as the carbon powder or the tiny paper pieces of the documents 200 would be temporarily stacked in the chamfer 521 during the scanning process and then be wiped away by the document 200 itself, so as to assure the dust 300 would not be stacked in the scanning area 57, hence the scanning device 100 in this invention is capable to maintain the scanning quality without cleaning the dust 300 even after a massive quantity of documents 200 are scanned. Furthermore, the scanning device 100 doesn't equip with a cleaning module so the manufacturing cost is low, the size of it is small and the noise is reduced.

What is claimed is:

1. A scanning device for scanning documents, comprising:
    a flat-bed scanning glass; and
    a contact image sensor, arranged above the flat-bed scanning glass, comprising:
        a protecting glass with a chamfer, wherein the chamfer and the flat-bed scanning glass form a scanning path therebetween, a middle area of the protecting glass is a scanning area, and the chamfer is arranged at a downstream position relative to the scanning area; and
        a hollowed frame extended in a horizontal direction, wherein the protecting glass is fixed and aligned at a bottom surface of the hollowed frame.

2. The scanning device as claimed in claim 1, wherein the contact image sensor further comprises a circuit board, a plurality of light emitters, a plurality of lenses and a plurality of photoelectric detectors, each of the lenses is paired with each of the photoelectric detector and each of the light emitter, and the plurality of the light emitters are arranged in a row inside the frame;
    and
    wherein each of the light emitters emits a beam that passes through the protecting glass to illuminate documents in the scanning path, the documents reflect the beam back to the lenses, the circuit board is arranged on an upper surface of the hollowed frame, the plurality of the photoelectric detectors are arranged on the circuit board to receive the beam focused by the lenses, and the beam reflected by the documents is arrived at the scanning area of the protecting glass.

3. The scanning device as claimed in claim 1, wherein the contact image sensor further comprises a light emitter positioned above the protecting glass for emitting a beam directly on the scanning area.

4. The scanning device as claimed in claim 1, wherein the chamfer forms the scanning path and the document is fed through the chamfer.

5. The scanning device as claimed in claim 1, wherein the protecting glass is flat.

\* \* \* \* \*